United States Patent
de Gouy et al.

(10) Patent No.: US 6,384,770 B1
(45) Date of Patent: May 7, 2002

(54) LINEARIZING DEVICE FOR A FREQUENCY-MODULATION RAMP AND ITS APPLICATION TO A RADIO ALTIMETER

(75) Inventors: Jean-Luc de Gouy, Briis S/Forges; Marc Chelouche, Sannois; Lionel Fousset, Athis-Mons, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 08/467,786

(22) Filed: Jun. 21, 1995

(51) Int. Cl.[7] .............................................. G01S 13/08
(52) U.S. Cl. ....................... 342/120; 342/122; 342/127; 342/135
(58) Field of Search ................................ 342/120, 122, 342/127, 130, 135

(56) References Cited

U.S. PATENT DOCUMENTS

| 4,539,565 A | * | 9/1985 | Norsworthy | ................ 342/128 |
| 4,593,287 A | * | 6/1986 | Nitardy | ...................... 342/200 |
| 4,682,175 A | * | 7/1987 | Lazarus | ...................... 342/165 |
| 5,574,552 A | * | 11/1996 | Dunne | ...................... 356/5.05 |
| 5,652,594 A | * | 7/1997 | Costas | ........................ 342/162 |

\* cited by examiner

*Primary Examiner*—John B. Sotomayor
(74) *Attorney, Agent, or Firm*—Oblon, Spivak, McClelland, Maier & Neustadt, P.C.

(57) ABSTRACT

The invention relates to a device for the linearization of a frequency modulation ramp comprising a voltage controlled oscillator associated with a phase locked-loop. The device comprises a digitally controlled oscillator of which only the most heavily weighted bit is used, and a digital phase comparator receiving, on the one hand, said most heavily weighted bit and, on the other hand, a signal supplied by the voltage controlled oscillator.

Application to very high linearity and very high accuracy radio altimeters.

10 Claims, 6 Drawing Sheets

LINEARIZING DEVICE FOR A FREQUENCY-MODULATION RAMP AND ITS APPLICATION TO A RADIO ALTIMETER

BACKGROUND OF THE INVENTION

This invention concerns a linearizing device for a frequency-modulation ramp. It applies to the field of radio altimeters, and more precisely to high linear and high precision radio altimeters.

It is well known that frequency modulation is used to generate linear frequency-modulation ramps which can be used in continuous wave (or CW) radio altimeters.

Such a radio altimeter is described, for example, in "Les Techniques de l'Ingénieur", E6601, page 11. This type of radio altimeter performs well at medium and low altitudes. However, it is generally admitted that only pulse radars provide sufficiently sensitive and accurate data at very high altitudes.

The factors which limit the performance of "FM/CW" radio altimeters at high altitude are:

the non-linearity of the signal modulation which results in a widening of the received signal spectrum.

the transmitter phase noise: the useful signal fades into the noise.

the transmission/reception coupling.

The main aim of the present invention is to extend the utilization range of frequency-modulation continuous wave radio altimeters to very high altitudes.

To achieve this, the invention features a device enabling to obtain a very high frequency-modulation linearity. The device uses a digitally controlled oscillator. This oscillator is also known as a "Direct Digital Synthesizer" hereafter referred to as a "DDS".

An oscillator of this kind has the inherent advantages of digital technology, which are as follows:

reduction or elimination of any required adjustments, good performance at high temperatures, increased reliability, frequency stability linked to that of the reference oscillator.

As has been shown, one of the conditions for obtaining a great accuracy from an altimeter is the use of a frequency-modulation ramp which is as linear as possible.

Current technology uses DDS's consisting of a phase accumulator, a memory containing a conversion table and a digital/analog converter. The increase in the number of stages, i.e. the number of bits, naturally implies greater accuracy. These devices are also to be operated at high frequencies.

By way of non limiting example, DDS's of this type are described in C. G. EKRC and S. I. LONG'S article "A Ga As 4-bit Adder-Accumulator Circuit for Direct Digital Synthesis" published in the "IEEE Journal of Solid-State Circuits", volume 23, No. 2, April 1988, pages 573–580 and in P. H. SAUL and D. G. TAYLOR'S article "A High-Speed Direct Frequency Synthesizer" published in the "IEEE Journal of Solid-State Circuits", volume 25, No. 1, April 1990, pages 215–219.

However, it should be mentioned that these circuits have very complex configurations, particularly as they operate at very high frequencies. Very fast technology (for example As Ga) and "pipeline" configurations must be used.

SUMMARY OF THE INVENTION

The invention aims to overcome the disadvantages of current technology whilst conserving the inherent advantages of digital circuits.

According to the present invention, there is provided a linearizing device for a frequency-modulation ramp comprising a voltage controlled oscillator fitted with an output and associated with a phase-locked loop, a clock generator having a determined frequency, a digitally controlled oscillator comprising a first accumulator controlled by a digital word for generating at least one digital step ramp varying in a determined direction at the rate of the determined frequency and a second accumulator fitted with a carry output and controlled by the digital ramp to supply a phase-variation digital step signal whose phase varies according to a parabolic law at the rate of the determined frequency and, inserted in the loop, a digital phase comparator having an output and a first and a second input respectively coupled to the carry output and to the output of the voltage controlled oscillator.

According to the present invention, there is further provided a radio altimeter comprising a transmitter for supplying a frequency-modulation ramp signal varying according to a linear law and a receiver for receiving the transmitted signal after reflection from a target at a determined distance resulting in a beat frequency between the transmitted signal and the received signal and a linearizing device of the ramp signal comprising a voltage controlled oscillator fitted with an output and associated with a phase-locked loop, a clock generator having a determined frequency, a digitally controlled oscillator comprising a first accumulator controlled by a digital word for generating at least one digital step ramp varying in a determined direction at the rate of the determined frequency and a second accumulator fitted with a carry output and controlled by the digital ramp to supply a digital step signal whose phase varies according to a parabolic law at the rate of the determined frequency and, inserted in the loop, a digital phase comparator having an output and a first and a second input respectively connected to the carry output and to the output of the voltage-controlled oscillator.

BRIEF DESCRIPTION OF THE DRAWINGS

Other advantages and characteristics of the invention will appear more clearly in the following description, which will refer to the appended drawings in which.

MORE DETAILED DESCRIPTION

Firstly, a brief description of the operation of a frequency-modulation radio altimeter will be given with reference to FIG. 1.

An instrument for the measurement of the altitude of an aircraft, or altimeter, consists of a transmission unit, a reception unit for the signal reflected by the ground, two directional antennas (aperture typically less than 10°) perpendicular to the attitude of the aircraft and a beat signal processing unit.

Data on distance h separating the aircraft from the ground are derived from the analysis of a signal, known as a beat signal, obtained by calculating the product of the transmitted signal $S_e$ (frequency ramp) and the reflected or received signal, from the target $S_r$, delayed by a duration $\tau$. $\tau$ satisfies the following relation:

$$\tau = \frac{2.h}{c} \text{ (in s)} \qquad (1)$$

where: h=height of the aircraft above the ground (in m)

c=electromagnetic wave propagation velocity (in m/s)

If the ground is flat and reflects perfectly (negligible Doppler effect), the beat frequency fb between the transmitted wave and the received wave satisfies the following relation:

$$fb = \frac{\Delta f}{T}\tau \text{ (in Hz)} \qquad (2)$$

where:

$\Delta f$=frequency excursion of the transmitted signal (in Hz), calculated from the base frequency $f_0$ T=modulation period (in s)

$\tau$=to-and-fro time (in s)

Figure 1:
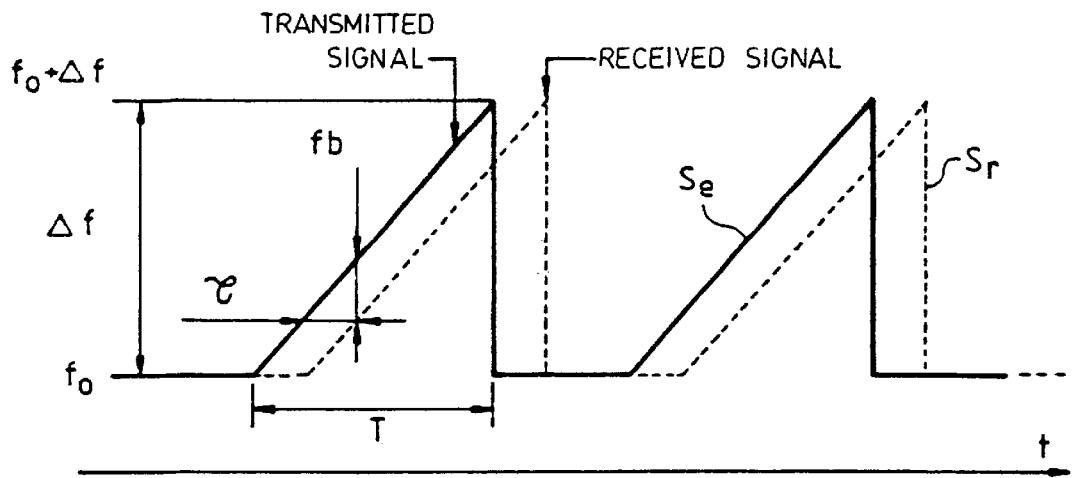
FIGS. 1 and 2 show the operation of a frequency modulation altimeter.

FIG. 1 is a chronogram showing frequency ramp variations according to time t. The transmitted frequency ramp, signal $S_e$ has been represented as a solid line and the received frequency ramp, signal $S_r$, as a dotted line. The particular velocity of the target or that of the measuring device introduces into the beat signal a frequency shift equal to the Doppler frequency, expressed by the following relation:

$$fd = \pm \frac{2Vr}{\lambda} \text{ (in Hz)} \qquad (3)$$

where:

$V_r$=relative radial velocity at the "bright" reflection point (in m/s)

$\lambda$=wavelength (in m)

If the antenna beam widens or is no longer perpendicular to the ground due to alterations to the aircraft's attitude, the beat frequency of a bright point is expressed by the following relation:

$$fb = \frac{f_0}{\cos\theta} \pm fd \qquad (4)$$

where $$f_0 = \frac{2h_0}{c}\frac{\Delta F}{T} \qquad (5)$$

where
in which:

$\theta$=angular value of the bright point with respect to the vertical $h_0$=height of the aircraft above the ground If increasing and decreasing frequency ramps of the same slope are transmitted alternately, the beat frequencies corresponding to the received signal maximum are given by the following relation:

$$f^+ = \frac{f_0}{\cos\theta} - fd \text{ for an increasing ramp} \qquad (6)$$

$$f^- = \frac{f_0}{\cos\theta} + fd \text{ for a decreasing ramp} \qquad (7)$$

By calculating the half-sum of the beat signals $f^+$ and $f^-$, it is possible to eliminate the Doppler effect on the height measurement:

$$fb = \frac{f^+ + f^-}{2} \qquad (8)$$

Figure 2:
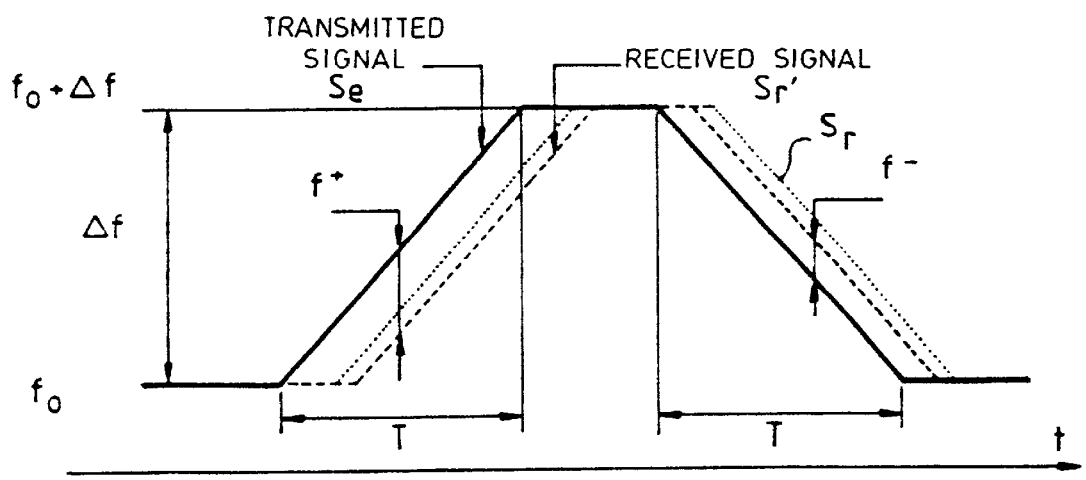

This process is represented in FIG. 2. The transmitted and received signals are referenced, $S_e$ and $S'_r$ respectively.

The signal $S_r$ which would be received in the absence of the Doppler effect is represented by a dotted line.

The range of this device is limited by:

the noise generated by the receiver: this is a function of the connection quality (transmitted power, antenna gain, noise factor, distance), the transmitter noise.

Accuracy depends on the ability of the device to associate a frequency with an echo at a given distance.

This is possible if the frequency modulation is perfectly linear only; linearity defects cause a line broadening, which in turn restricts the accuracy of the measurement.

The phase noise of the transmitter source is a characteristic to which particular attention should be paid.

Transmitter noise is all the more disruptive since the device is intended for measuring long distances and, independently of the connection quality it restricts the range of the device.

It is therefore clear that a prerequisite for the realization of a long-range, accurate radio altimeter is the possibility of obtaining a frequency ramp with a very high degree of linearity.

Typically, approximate values would be as follows:

frequency excursion: 100 MHz ramp duration, equal to 100 $\mu$s at 100 MHz, i.e. a $\Delta FT$ of $10^4$ to $10^7$.

average transmission frequency of between 1 GHz and 60 GHz.

The quality of the frequency ramps is conventionally defined by the linearity, i.e. by the variation of the ratio $$\left(\frac{df}{dt}\right)$$

and is resumed by the coefficient $$\left(\frac{slope_{max}}{slope_{min}} - 1\right) \times 100$$

expressed as a percentage, in which "$slope_{max}$" is the maximum slope and "$slope_{min}$" is the minimum slope.

A voltage controlled oscillator, which shall hereafter be referred to as a "VCO", enables a coefficient of the order of 20% to 30% to be attained. By adopting standard linearization measurements, approximately 1% can be attained.

Obviously an improvement to this situation, and a value of 1% or better, is sought.

A number of physical considerations should be restated at this stage. A linear increase of the frequency implies a correlative parabolic increase of phase with time.

Figure 3:
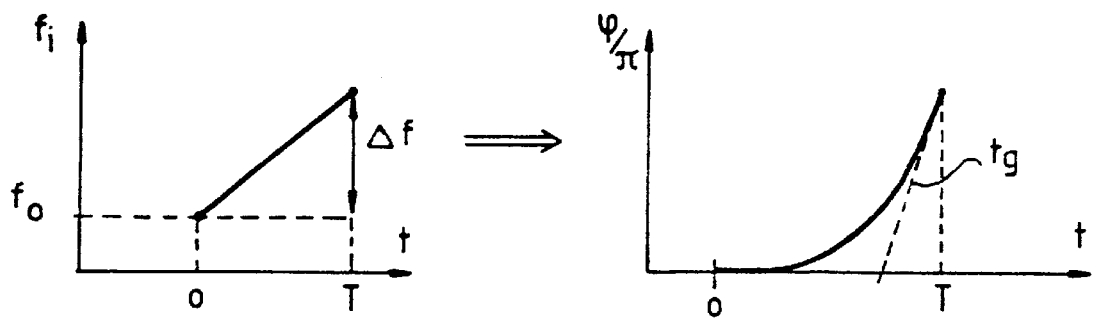
FIG. 3 is a theoretical diagram showing the variations of a frequency-modulation ramp according to time and the corresponding phase variations in a Direct Digital Synthesizer (DDS)

FIG. 3 illustrates this. On the left-hand side of the figure is represented a frequency ramp. The vertical axis represents instantaneous frequency $f_i$. Frequency $f_i$ increases by $\Delta f$ during time interval (0–T). The expression $$\left[\frac{\Delta FT}{2}\right]$$

indicates the gain in "number of revolutions" on the transmitted frequency $f_i$ and satisfies the following relation:

$$f_i = f_0 + \Delta f \frac{t}{T}. \quad (9)$$

The value $$\frac{\Delta \varphi}{\pi}$$

is calculated in the following manner:

$$\left[\frac{\Delta \varphi}{2\pi}\right] = \int f_i dt = f_0 \times t + \frac{\Delta f}{T} \times \frac{t^2}{2}. \quad (10)$$

$$\left[\frac{\Delta \varphi}{2\pi}\right]$$

is therefore a parabolic function. For t=T, at the end of the interval, the slope of the curve (tangent tg) representing the function is equal to $$\frac{\Delta FT}{2}.$$

The right-hand side of FIG. 3 illustrates this result.

In reality, for reasons which have been shown, digital technology is used. It is known that, in this case, continuous variation can never be achieved. There is a progression via a series of value jumps giving approximations of the functions to be generated.

Figure 4:
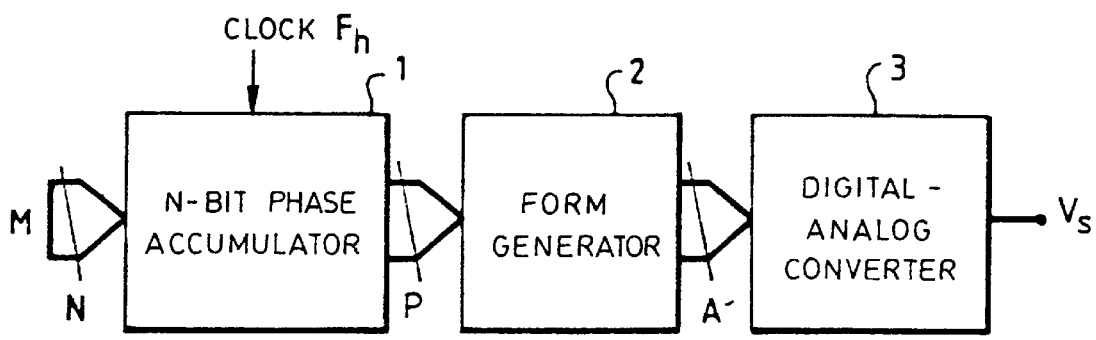
FIG. 4 is a schematic diagram of a Direct Digital Synthesizer according to current technology.

FIG. 4 shows a complete DDS according to current technology. Such a circuit is described, for example, in the two above-mentioned articles.

It features a phase accumulator 1 controlled by a digital word M of N bits. This accumulator receives clock signals $F_h$ which synchronize its operation. The digital signal or output word P is transmitted to a shaping generator 2 or conversion table. This circuit 2 is generally based on a memory addressed by the output word P. This memory in turn generates an output word A according to the law pre-recorded in the memory. Finally, this digital word A is converted into an analog output signal $V_s$ by a digital/analog converter 3.

Under current technology, this type of device has essentially been used to generate functions of a determined form. It is therefore important to remain as close to these as possible. To do this, it has been proposed to increase the number of bits which in turn enables increased accuracy. However, the complexity of the circuits increases in direct proportion to the number of bits used. In addition, propagation times in the circuits should be taken into account at high frequency. It is also difficult to realize very fast memories.

The invention draws upon certain characteristics of the application envisaged; i.e. the linearization of a frequency ramp for a radio altimeter.

Figures 5, 6:
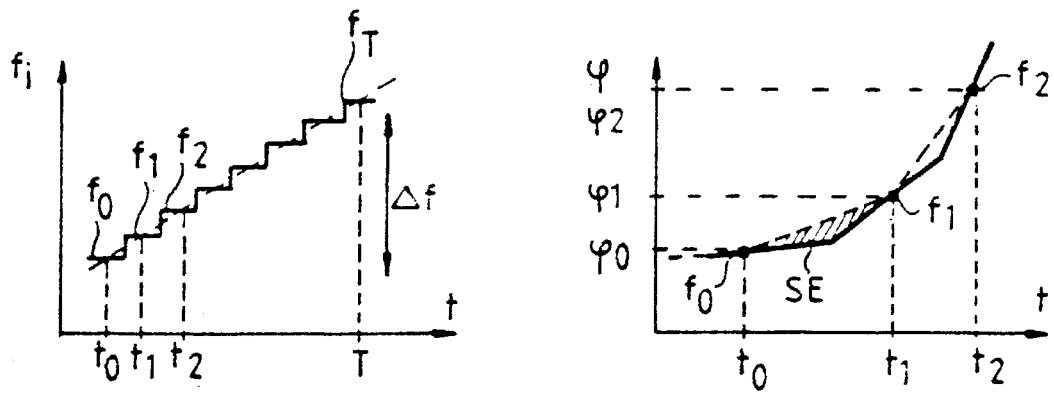
FIGS. 5 and 6 show the discrete variations of frequency and phase in a Direct Digital Synthesizer.

FIG. 5 shows a digital frequency ramp, i.e. in fact a pseudo-ramp consisting of steps $f_0, f_1, f_2 \ldots f_T$ for instants $t_0, t_1, t_2 \ldots t_T$. It will be expressed by a "facet" type approximation of the phase ramp.

FIG. 6 shows, for time interval $t_0$ to $t_2$, the corresponding phase $\varphi$ variation. Phase values $\varphi_0, \varphi_1$ and $\varphi_2$ Will correspond to each frequency increment $f_0, f_1$ and $f_2$ in FIG. 6. A "facet" type curve is obtained. The phase error is the distance between the theoretical curve (equation (10)), represented by a dotted line in the figure, and the "facet" type curve, represented by a solid line. The phase error can also be characterized by the "error area" SE, i.e. the area between the two curves as delimited by two sampling instants, $t_0$, and $t_1$ for example. The invention is based on the premise that error minimization does not correspond, firstly, to obtaining maximum accuracy on each step of the frequency curve but rather to increasing the number of "facets" even if their slope is less accurate. This increase has two interesting consequences:

from a certain speed onwards, the phase error becomes of the order of one radian; the result is that the transmitted spectrum is thus small (approximation of small angles); the spectrum of this error is spread over a wider and wider band.

In summary, a high degree of phase accuracy can be obtained whilst at the same time limiting the number of bits by increasing the sampling frequency.

Only those instants at which the squared signal representing the instantaneous synthesized signal passes to zero are counted. This passage to zero must be accurate.

Drawing upon what has just been described, the device according to the invention carries out a direct phase comparison on digital signals. The signal derived from a frequency divider is digital and, prior to digital-analog conversion in the DDS, the signal is also digital. In the device according to the invention, the memory containing the conversion table (phase/amplitude) and the digital-analog converter of the DDS are eliminated. The invention works upon the most significant bit of the output word of the phase accumulator.

This solution produces a phase noise which is distributed over a frequency band equal to that of the DDS clock at the level of the beat signal due to the phase shift produced on the DDS output signal.

Figure 7:
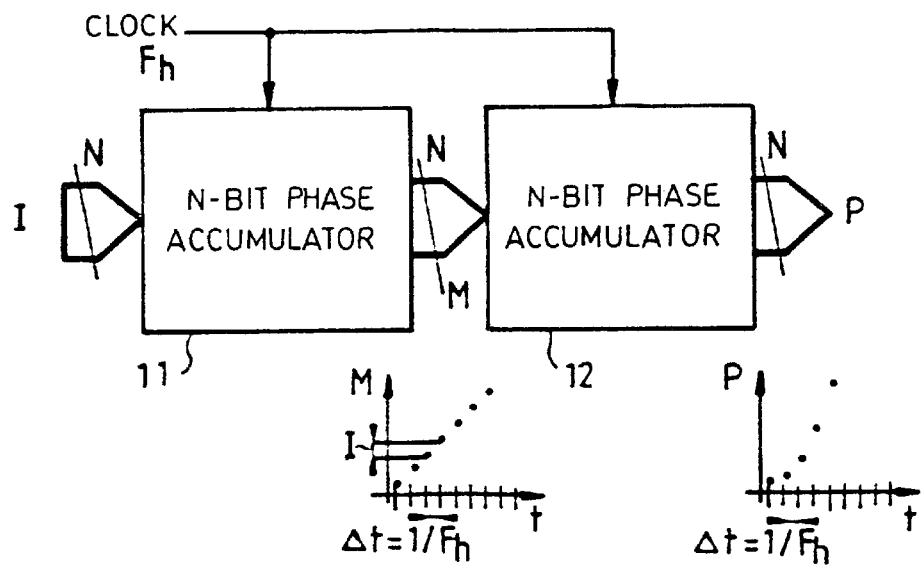
FIG. 7 is a schematic diagram of a Direct Digital Synthesizer according to the invention.

A frequency-modulated oscillator according to the invention is schematically illustrated in FIG. 7. It consists of 2 accumulators each with N bits, 11 and 12, which play the role of accumulator 1 in FIG. 4. These accumulators operate at the rate of the clock frequency $F_h$. The first receives a binary word I of N bits and outputs a digital ramp M with step variations which are all equal to I, as illustrated in the diagram in the lower part of FIG. 7; this diagram shows the variations of M as a function of time. The time increments are inversely proportional to the frequency $F_h$, i.e. $\Delta t=[1/F_h]$.

The second accumulator, 12, outputs a word P of N bits. The values of this word obey a parabolic law as has been indicated. These variations are illustrated by the diagram in the lower part of FIG. 7.

The phase variation speed corresponds to the DDS output frequency.

$$\frac{d\varphi}{dt} = \frac{F_h}{2^N} M \quad (11)$$

where:

N=the number of bits of the phase accumulator, $F_h$=clock frequency of the accumulator.

The phase accumulator is a N bit counter which establishes a partition over $2_N$ divisions of the phase circle associated with the signal period T.

The number M represents the width of the phase jump, i.e. the phase change accumulated during the time interval between two clock pulses.

Figure 8:
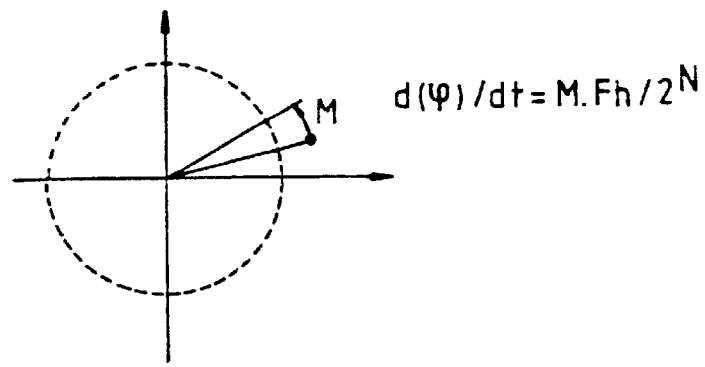
FIG. 8 is a diagram illustrating a particular point of the operation of such a Direct Digital Synthesizer.

FIG. 8 illustrates this operating mode. To obtain a linear frequency modulation of positive slope, the phase jump M must increase in a linear fashion.

The use of a supplementary reversible counter is necessary to generate the linear increase or decrease of M on the basis of an input parameter I proportional to the slope of the frequency ramp if a double ramp signal is required.

A second parameter is required to establish initialization of the counters in order to select the initial frequency, the central frequency, etc..

If a frequency ramp of frequency excursion $\Delta F$ and duration T is required, the following relation must be satisfied:

$$\frac{\Delta f}{T} = \frac{I(f_H/2^N)}{T_H} = \frac{H_H^2}{2^N}$$

where N is a whole number and I=1 (12).

By way of indication, if the clock frequency is 1 GHz, $\Delta f=25$ MHz and T=8 ms, the accumulator must have at least 28 bits. The phase is increased in linear fashion at each clock pulse. The maximum phase error can reach the value (2M/15), i.e. 24 ° at 65 MHz.

In the context of the invention, only the most significant bit or "carry" bit is used. More precisely, each stage of accumulators 11 and 12 consists of a 1-bit adder.

Figure 9:
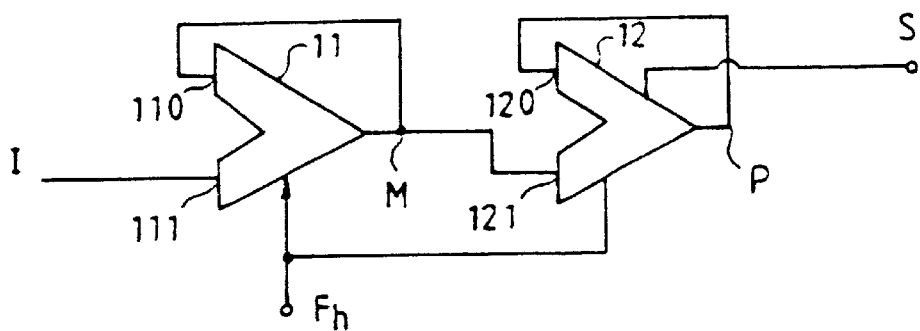
FIG. 9 is a schematic diagram of a stage of such a Direct Digital Synthesizer.

FIG. 9 schematically illustrates a stage of the two accumulators 11 and 12.

The first accumulator, 11, receives on a first input a bit of command word M and, on a second input 110, the output (a bit of M) of this accumulator. This configuration is repeated in accumulator 12, which receives the output of accumulator 11 (a bit of M) on a first input 121 and its own output (a bit of P) on a second input 120. The most significant carry bit S of the adder circuit 12 will be used for phase comparisons as described below.

The two accumulators receive the clock signals $F_h$ in synchronized fashion.

The DDS modified according to the provisions of the invention enables the synchronization of the phase loop of a voltage controlled oscillator, hereinafter called a VCO for the sake of simplicity. The description will be made with reference to the main application of the invention, and more particularly with reference to the context of a radio altimeter transmitter.

Two configurations can be implemented:

"direct" modulation: the VCO, which is frequency modulated, directly supplies a signal at the transmission frequency;

"transposed" modulation: the modulated signal is generated at an intermediate frequency (IF), for example in a frequency band of between 150 and 250 MHz, then transposed to the microwave band.

Figure 10:
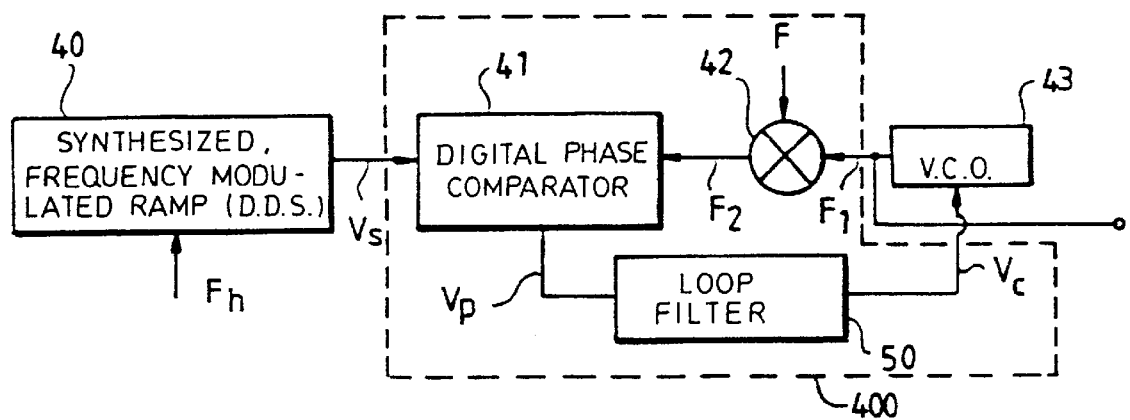
FIG. 10 is a schematic diagram of a frequency-modulation ramp linearizing device according to the invention.

The general configuration of a device for the linearization of a frequency ramp according to the invention is schematically illustrated in FIG. 10. It consists of a DDS 40 as described above. This DDS synthesizes a frequency-modulation ramp. The output signal $V_s$ made up of a carry bit is transmitted to a digital phase comparator which compares the signal $V_s$ bit by bit to a signal of frequency $F_2$. This latter signal is obtained by transposition of the frequency $F_1$ generated by a VCO 43. This transposition is conventionally carried out by a harmonic mixer 42 on the basis of a frequency F generated in turn by a supplementary oscillator. The assembly 41, 42 and 50 represents the phase-locked loop (or PLL) 400 of oscillator 43.

The signal $V_p$ derived from the comparison is then transmitted to a band-rejection filter 50, as is conventional, whose output (signal $V_c$) controls the voltage of VCO 43. As indicated above, DDS 40 receives a clock signal $F_h$ which, under one of the variant embodiments described below, may be the signal F (or at least a signal derived from this) and of the same frequency.

Figure 11:
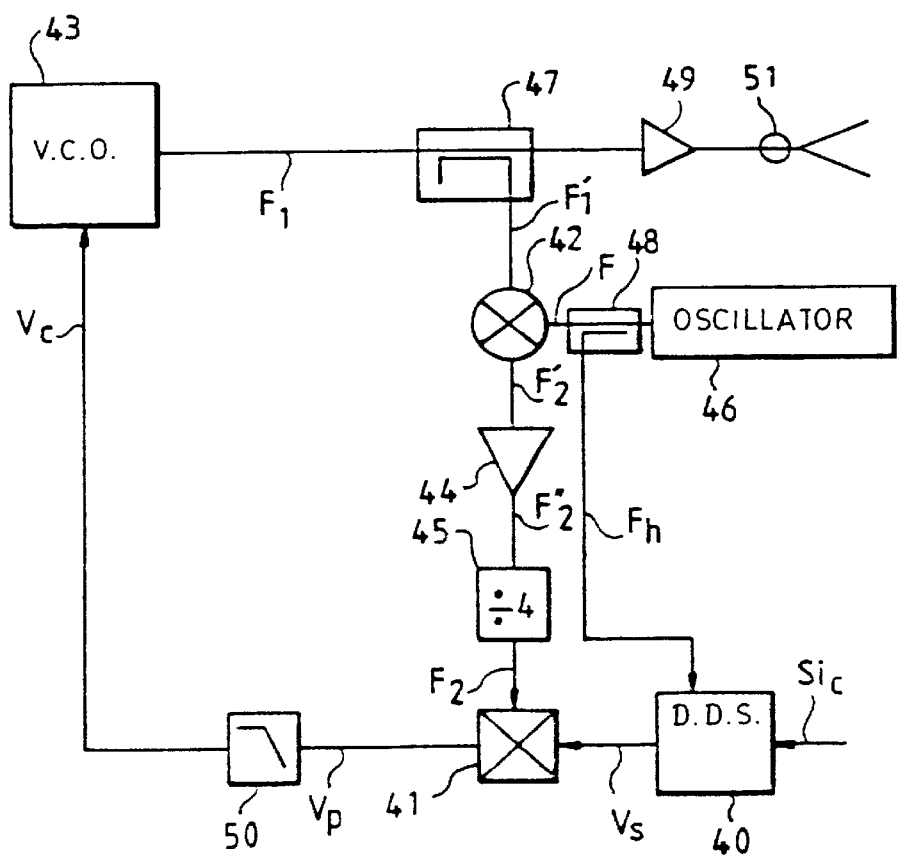
FIGS. 11 and 12 show, in detail, two variant embodiments of the linearizing device according to the invention.

FIG. 11 illustrates in detail a first variant embodiment corresponding to the "direct" modulation configuration referred to above.

By way of indication and to provide a non-limiting example application, a device with the following characteristics will be considered:

transmission frequency: 17 GHz, ramp frequency excursion: 100 MHz, ramp duration: 8.4 ms. Experience shows that these values correspond to an optimized antenna compromise (power/dimensions).

The component elements of this device are as follows:

a microwave cavity VCO 43 generating an average frequency of 17 GHz, a harmonic mixer 42, a 1 GHz local oscillator 46, a tracking amplifier 44, intermediate frequency F1 a by-four frequency divider 45, a AsGa technology DDS 40 whose clock frequency $F_h=1$ GHz 28 bits, a digital phase comparator 41, a loop filter 50, a 17 GHz microwave power amplifier 49, a transmission antenna 51.

The VCO 43 is frequency modulated on the basis of an error signal supplied by a phase-locked loop. This loop consists of a coupler 47 receiving the output signal of the VCO, of frequency $F_1$, which is transmitted to antenna 51 via a power amplifier 49. Coupler 47 transmits a signal $F'_1$ which has the same frequency as $F_1$ to harmonic mixer 42. The loop also includes intermediate frequency amplifier 44, by-four divider 45, digital phase comparator 41 and loop filter 50. This latter is a passband filter whose output signal $V_c$ controls the voltage of VCO 43.

The intermediate frequency $F_2$ obtained falls into the 160–260 MHz range ($\Delta f$=100 MHz).

Under this variant embodiment the pump signal F of the harmonic mixer and the clock signal $F_h$ have the same frequency and are generated by the same oscillator 46 via coupler 48.

The reference signal of phase comparator 41 is produced by DDS 40. Its frequency excursion and ramp duration are controlled by a device management microprocessor via a fast logic circuit (not represented) supplying digital control signals $Si_c$.

The $F_h$ frequency pilot of DDS 40 is an oscillator 46 of the Surface Acoustic Wave Resonator Oscillator (SAWRO) type. It can also be based on a Dielectric Resonator Oscillator (DRO). This oscillator is slaved and operates around the 1 GHz frequency. This enables a whole division increment of the order of 1 ns to be attained.

The other signal $F_2$ to be applied to phase comparator 41 is obtained following the frequency transposition of signal $F'_1$ derived from signal $F_1$ from DDS 40 using harmonic mixer 42 whose pump signal F is that of oscillator 46.

The signal obtained is of very low amplitude and is first amplified (signal $F''_2$) before having its frequency divided by 4. The advantage of carrying out this frequency division, which is intended to reduce the phase jumps applied to phase comparator 41 of the loop, is questionable in that considerable phase noise is produced due to the frequency transposition (ratio of seventeen). In this case, instead of a variation $\Delta f_{DDS}$=25 MHz being imposed upon DDS 40, one of $\Delta f_{DDS}$=100 MHz is imposed instead. This means that by-four divider 45 is eliminated.

In any event, the phase error produced by DDS 40 on the output signal of VCO 43 remains the same.

Figure 12:
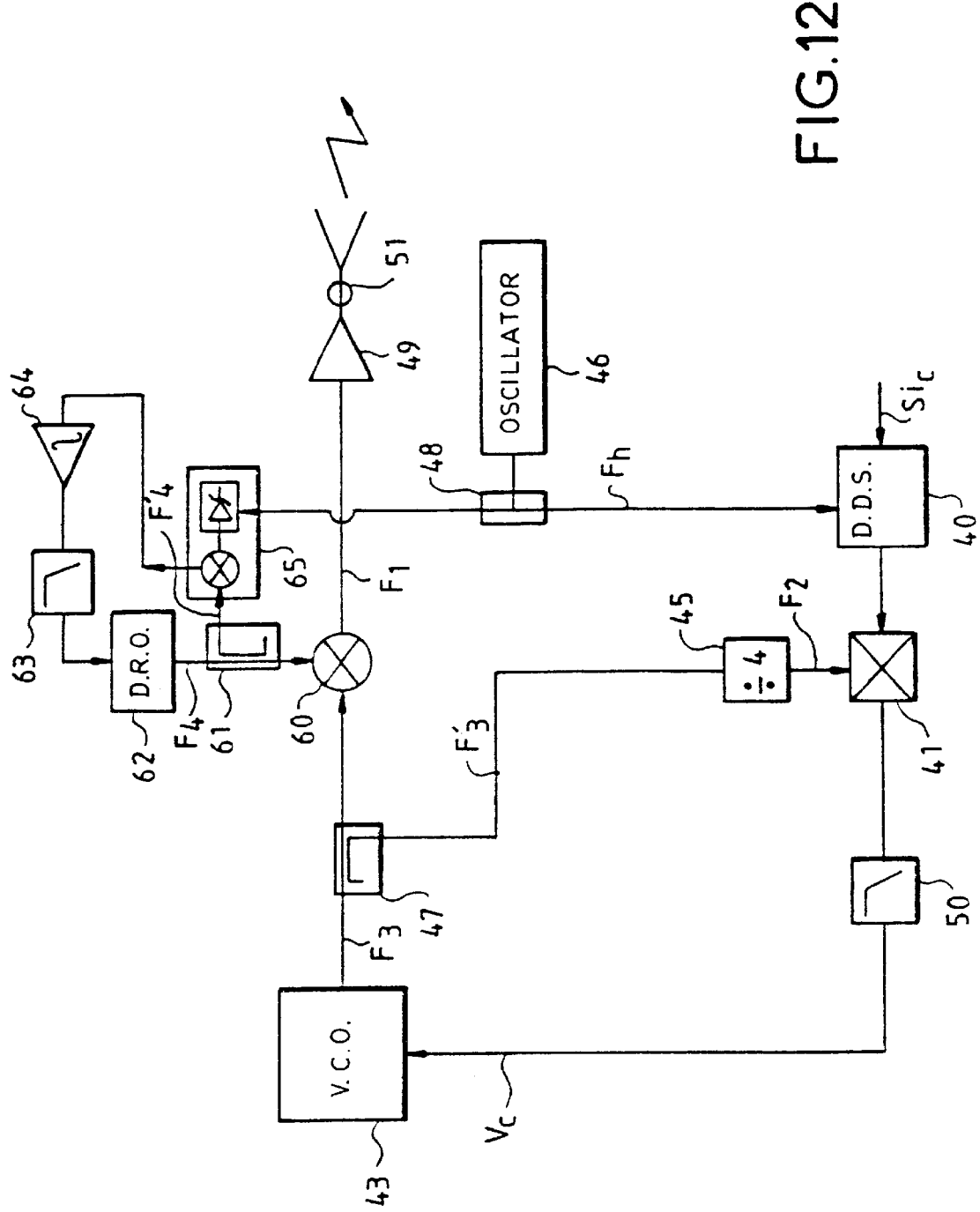

FIG. 12 gives a detailed illustration of a second variant embodiment corresponding to the "transposed" modulation configuration referred to above. Those elements which are common with FIG. 11 are identified by the same references in FIG. 12 and will not be redescribed.

The main difference between this device and the previous one is the addition of a mixer 60 to obtain the modulated signal at the output frequency.

A stable microwave oscillator 62, for example of the DRO type as described above, is used to pilot the transposition process. An intermediate frequency VCO 43 (160–260 MHz, for example) generates the frequency-modulation ramp $F_3$ by slaving to the DDS ; this signal is then transposed (signal $F_1$) by mixer 60.

In addition, output amplification stage 49 must have a higher gain; the close presence of the image band requires the implementation of a filtering rejection process.

The main advantage of this solution with respect to that described above consists in the elimination of the harmonic mixer and its tracking amplifier (FIG. 11: 42 and 44).

DRO oscillator 62 is slaved by a phase loop consisting of a coupler 61 distributing the output signal $F_4$ of DRO 62 to mixer 60 and to a device 65 which will be termed the "sampling head" 65 (signal $F'_4$ of the same frequency). This latter device 65 synchronizes the loop using the clock signal $F_h$ generated by oscillator 46 and also distributed, via coupler 48, to DDS 40.

As above, if the frequency excursion imposed upon DDS 40 is 100 MHz, the by-four divider 45 is not used.

Finally, as indicated above, the Doppler effect can be eliminated by generating a double ramp in either the variant embodiment described in FIG. 11 or that described in FIG. 12.

Figure 13:
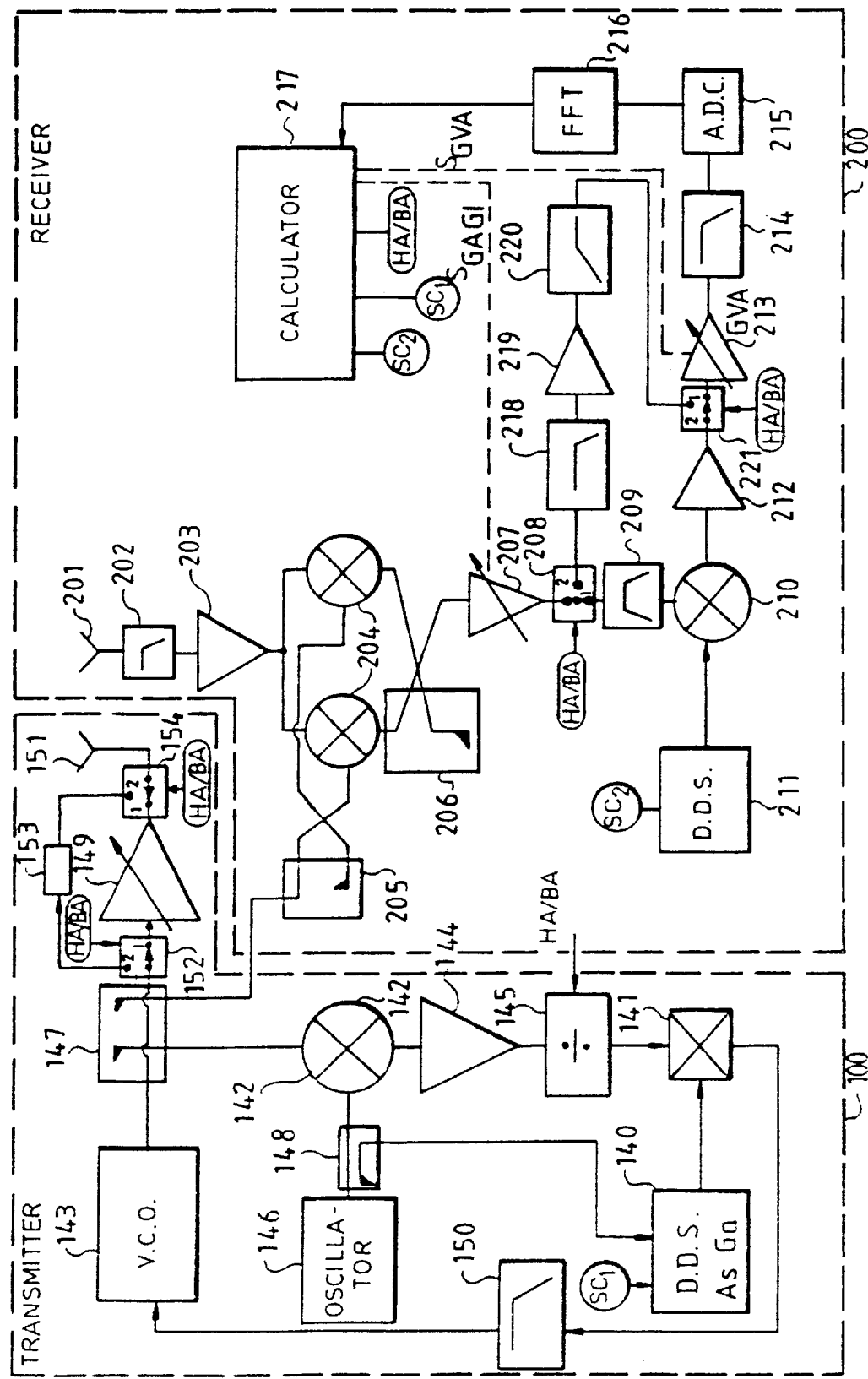
FIG. 13 shows an example embodiment of a radio altimeter incorporating a linearizing device according to the invention.

The device described in the two variant embodiments given above represents only the transmitter part of a radio altimeter. FIG. 13 illustrates a complete embodiment of a radio altimeter.

It has been supposed that the transmitter part, identified by the reference 100, is realized in accordance with the variant of FIG. 11. The common elements have the same references augmented by one hundred, and will only be redescribed where necessary.

The radio altimeter according to the invention is likely to operate at both high and low altitude.

It therefore carries out two types of measurements:
short range (or low altitude) measurement, long range (or high altitude) measurement.

The retrieval of the beat signal consists in mixing the transmitted signal (frequency ramp) with the received signal (correlator receiver), using a technique which is well known.

This function is obtained using an Image Rejection Mixer (IRM), which enables the noise contained in the image band to be eliminated.

This stage is preceded by a low-pass waveguide filter with low-loss characteristics tuned to the transmission frequency band (noise reduction and attenuation of off-band jamming) followed by a low-noise amplifier.

An overall noise factor of 5 dB can be obtained for the receiver.

The variation of the dynamics of the beat signal between "high altitude" (HA) and "low altitude" (LA) operation can be very great, and several processes must be implemented to reduce its effects:

a) Reduction of transmitted power at low altitude.

The output signal of VCO 143 is amplified by a power stage 149. It is possible to dispense with the use of this latter at low altitudes. The aircraft carrying the radio altimeter will, moreover, be less easy to detect if this measure is adopted.

b) Addition of a fixed-gain amplifier IF in the reception channel at high altitude. The reception dynamic between the two altitude ranges is fixed and equal to: $D = 20 \log h_1 - 20 \log h_2$ where $h_1 \gg h_2$.

The implementation of a fixed-gain amplifier enables this amplitude discrepancy to be easily compensated for.

c) Saturation of the reception stages in the case of excessive specular echo. The minimum level of reflectivity for a diffusing ground surface is of the order of $-25$ dBm$^2$/m$^2$, and for a specular echo the theoretical maximum level of reflectivity is $$\frac{Gr}{4}$$

where G is the antenna gain and r is the coefficient of reflectivity. Slight amplitude saturation of the signal is quite tolerable given that this phenomenon is very rare. By way of example, the specular echo of a tarmacked road gives a measurement of the order of +10 dBm$^2$/m$^2$.

The dynamic level of the stage compensating for fluctuations of reflectivity independent of the altitude of the aircraft is estimated at 40 dB. This can be taken into account using an AGC (automatic gain control) on the IF amplifier.

The particular features of altitude measurement for the two ranges "High altitude" and "Low altitude" (hereafter termed HA and LA) will now be described.

Firstly, high altitude reception will be described. The receiver with the reference 200 formats the beat signal in order for it to be used to obtain the height measurement.

At high altitude (16.000 m<h<25.000 m) a frequency ramp of duration 8.4 ms and excursions 100 MHz is transmitted.

The beat signal therefore has a frequency in the range given below (signal not influenced by Doppler effect):

$$f_b = (20000 \text{ m}) = \frac{2 \times 20000 \times 100.10^6}{3.10^8 \times 8.410^{-3}} = 1.587 \text{ MHz}$$

$$f_b = (25000 \text{ m}) = 1.984 \text{ MHz}$$

$$f_b = (16000 \text{ m}) = 1.270 \text{ MHz}$$

It is supposed that the frequency analysis can be carried out using a Fast Fourier Transform (FFT) processor on a frequency range of between 0 and 128 kHz with granularity of 250 Hz.

To carry out the measurement, it is necessary to transpose the frequency of the beat signal in order to effect a "frequency magnification" on the spectrum to be calculated.

The proper execution of this adjustable magnification is based on the use of a mixer and a DDS.

This synthesizer is controlled to provide the frequency agility necessary to track the beat frequency.

Using the same analysis parameters as above, the acquisition duration is 1024–4 $\mu$s=4.096 ms, and the calculation time of the Fourier Transform is a few hundredths of a micro-second.

If the same number of samples is retained for a duration twice as long corresponding to the duration of the ramp, the frequency resolution is doubled and the frequency analysis range halved, i.e. reduced to 0–64 kHz.

A solution using a sampling frequency which is twice as high, i.e. 512 kHz, requires the use of fast, and therefore expensive, integrated circuits.

Increasing the resolution is not useful due to the width of the beat spectrum (B≈8 kHz).

The selection of the DDS transposition frequency is carried out by a calculator circuit fitted to the radio altimeter in such a way as to center the analysis window on a mean beat frequency.

Fluctuations of the beat frequency due to the Doppler effect should not pose problems.

In a first approximation, $V_r = v \text{ tg } \alpha$, where:
v=velocity of vehicle with respect to horizontal ground,
$V_r$=radial velocity,
$\alpha$=angle of ground with respect to horizontal.

For a variation of the slope of the ground of the order of the variations in the attitude of the aircraft at V=1000 m/s, the radial velocity $V_r$ attained for $\alpha=2°$ is equal to 35 m/s, i.e. a beat frequency shift of 4 kHz.

Phenomena corresponding to highly localized variations of terrain height (ditches, dykes, etc.) will result in transient pulses on the beat signal.

In addition, even if the beat signals move beyond the frequency analysis window, there will still be bright points on the ground within the antenna beam which reflect the incident wave without taking the Doppler effect into account.

By way of example, the reception channel of a 17 GHz radio altimeter is composed as follows:

A antenna 201.
A low-pass filter 202 with a cut-off frequency of 20 GHz.
A low-noise amplifier 203 with NF=3.5 to 4 dB and gain G=20 dB at F=17 GHz.
A double IRM mixer 204 with L=10 dB at F=17 GHz. The frequency signal comes from transmitter part 100, or more precisely from VCO 143 via couplers 147 and 205.
A wide-band coupler 206 which recombines the output signals of the mixers to produce a IF signal.
A variable-gain amplifier 207 to compensate for fluctuations in the reflectivity of the ground surface, of minimum dynamic level 50 dB and passband of 10 kHz 2 MHz.
A passband filter 209 of $\Delta f$=500 kHz and of central frequency $f_{central}$=1.750 MHz.
A mixer 210.
A DDS 211 of frequency step 10 kHz and of output frequency of between 1.4 MHz and 2 MHz.
A low frequency fixed-gain amplifier 212 to compensate for attenuation between the high and low altitude ranges; the attenuation variation is typically:
$\Delta G$=20 log 25000–20 log 30=58 dB.
The attenuation difference between the upper and lower limits of the high altitude range:
$\Delta A$=20 log 25000–20 log 16000=3.8 dB.
A Gain Variable with Altitude (GVA) stage 213 which compensates for variations in gain according to a law of $1/h^2$ per step of 0.5 dB.
An anti-return low-pass filter 214 with cut-off frequency $f_c$=110 KHz.
An n-bit analog-digital converter 215.

The overall noise factor of the receiver can be estimated at 5 dB given the current state of technology in this field.

The reception channel must be linear and not feature peak clipping so as not to generate spurious signals which could either be construed as the beat signal or make this latter disappear in cases where it is of low amplitude.

The ease with which a harmonic signal of known frequency between 0 and $F_H/2$ using a DDS make it possible to carry out measurements between the HA and LA ranges. Signal dynamics and saturation problems can be resolved using the GVA 213 unit.

The reception channel includes a rapid-action AGC capable of reacting to any variation in the reflectivity of the ground surface in order to maintain the amplitude of the signal at the input of analog-digital converter 215 at a constant level by acting upon amplifier 207.

Reception at low altitude will now be described.

The accuracy required on the distance measurement necessitates a signal analysis capacity (granularity of the FFT) in relation with the beat frequency of the signal; the adjustment of the sawtooth period duration and/or the frequency excursion $\Delta f$ becomes necessary.

In order to measure the beat frequency of this signal it is necessary to maintain this frequency within a range determined according to the altitude.

The duration of the sawtooth period will therefore be adjustable according to altitude for each operating range.

The frequency excursion can be automatically doubled. Instead of by-four frequency division (high altitude stage) prior to carrying out the phase comparison process in the transmission channel, the device divides it by eight. To achieve this, a HA/LA signal is used. As will be seen below, this signal is produced by a calculator 217.

In addition, the receive signal level varies by $1/h^2$ according to the altitude.

It is necessary to reduce the transmitted power. This can be achieved by shutting down power amplifier 149 at transmission and by connecting an attenuator 153 between VCO 143 and antenna 151 using switches.

The GVA 213 unit compensates for these variations according to the altitude ranges and a 6 dB/octave high-pass filter 220 inserted in the LF (Low Frequency) channel maintains the signal at the input of the analog-digital converter at a constant level.

The ranges are switched by half-octave of altitude in order to limit frequency jumps.

The Low Altitude channel consists of the following elements, certain of which it shares with the High Altitude channel:

Low-pass filter 202.
Amplifier 203.
IRM mixer 204.
Variable-gain amplifier 207.
A low-pass filter 218 of cut-off frequency 110 kHz.
A 1 kHz–110 kHz low-frequency amplifier 219 of gain $G_{BF}$.
A high-pass filter 220 with a slope of 3 dB/octave and a cut-off frequency of approximately 110 kHz so as to maintain the output reflectivity at a constant level.
The 213 GVA (Gain Variable with Altitude) attenuator, which adjusts the gain according to the $1/h^2$ law (range switching per half-octave of altitude) to obtain the output amplitude signal proportional to the reflectivity of the ground surface. This consists of a digitally controlled logarithmic attenuator.
The anti-return low-pass filter 214 with cut-off frequency $f_c$=110 KHz.
The n-bit analog-digital converter 215.

The transmission and reception channels therefore have two operating modes to enable them to function in both the high and low altitude ranges.

The radio altimeter features a calculator 217. This calculator uses various data relating to the operating mode (inert, standby, measurement), the attitude of the aircraft and the beat signal to extract the value of the perpendicular height between the aircraft and the ground.

Calculator 217 controls:
for the transmission part:
DDS 140 using the control signal $SC_1$,
frequency divider 145 (by-four or by-eight) if it is present using a HA/LA (High Altitude/Low Altitude) signal,
switching during transmission of power amplifier 149 or attenuator 153 using the same HA/LA signal via a pair of two-position (1 and 2) switches 152 and 154. Position 1 on these switches corresponds to High Altitude mode, while position 2 corresponds to Low Altitude mode;
for the reception part:
switching of the high and low altitude channels using the HA/LA signal and two-position switches 208 and 221,
DDS 211 using signal $SC_2$,
GVA module 213 using a signal $S_{GVA}$ and amplifier 207 using a control signal $S_{GAGI}$.

It also manages FFT processor 216 used to calculate the beat spectrum by Fast Fourier Transform.

This FFT processor 216 supplies its results in the form of a ray spectrum.

The same processing is applied to the beat signal on each ramp (rising and falling).

Known signal processing methods are used to extract height data.

A solution based on digital processing offers a number of advantages when compared to a conventional analog processing solution:

a high degree of coherence of the height measurement in all flight configurations, the capacity to track several targets continuously, a wide observation window (greater than 100 kHz) enabling high dynamic response to rapid variations in terrain.

The beat signal spectrum is calculated by Fast Fourier Transform for each ramp.

The Doppler effect is eliminated by calculating the half-sum of the beat spectrum maxima obtained at successive modulations of rising and falling ramps (see relation (8)).

The signal processing is designed to extract data relating to the height of the aircraft above the ground.

It consists of the following stages:

calculation of the spectrum by Discrete Fourier Transform (DFT), detection and extraction of maxima, temporal coherence verification of the measurement, trajectory filtering.

Spectrum calculation using DFT in conventional systems is defined by the frequency range (linked to the sampling frequency) and the granularity or frequency resolution (linked to the number of analysis points) used.

It was indicated above that the parameters used were a sampling frequency of 256 kHz for a maximum of 1024 points. A higher sampling frequency can be used to avoid the beat signal frequencies moving outside the analysis window due to significant Doppler effect phenomena.

The useful data is contained in the spectra calculated above.

The detection process enables these data to be extracted on the basis of the position of a spectral energy maximum which exceeds a detection threshold.

The verification of the temporal coherence of the data consists in determining whether the detection carried out at a given instant corresponds to previous detections with respect to a prediction model and to within a predefined tolerance.

At this level the data is in "raw" form.

A navigation filtering process can be applied to the measurement carried out to attenuate any noise. The filtering used is of the $\alpha$, $\beta$ type.

The invention is not limited to the variant embodiments described above. In particular, precise values have been quoted solely for the purpose of illustrating an example application more precisely.

What is claimed is:

1. A Linearizing device for a frequency modulation ramp comprising a voltage controlled oscillator fitted with an output and associated with a phase-locked loop, a clock generator having a determined frequency, a digitally controlled oscillator comprising a first accumulator controlled by a digital word for generating at least one digital step ramp varying in a determined direction at the rate of the determined frequency and a second accumulator fitted with a carry output and controlled by the digital ramp to supply a phase-variation digital step signal whose phase varies according to a parabolic law at the rate of the determined frequency and, inserted in the loop, a digital phase comparator having an output and a first and a second input respectively coupled to the carry output and to the output of the voltage controlled oscillator.

2. A device as claimed in claim 1, which comprises a harmonic mixer inserted in the loop for coupling the voltage controlled oscillator to the digital phase comparator, this mixer having an input to receive clock frequency signals.

3. A device as claimed in claim 1, which comprises a frequency divider inserted in the loop and having a determined dividing ratio and with an output connected to the second input of the digital phase comparator.

4. A device as claimed in claim 3, wherein the dividing ratio can be switched by a control signal between at least two values.

5. A device as claimed in claim 1, wherein each accumulator comprises several stages disposed in parallel, each stage consisting of an adder with an output, a first input for receiving a bit of a digital word to be added and a second input connected to its output.

6. A device as claimed in claim 1, wherein the digital word controlling the first accumulator includes a negative/positive sign datum enabling the generation of a double frequency ramp comprising one rising part and one falling part symmetrical with respect to the rising part.

7. A radio altimeter comprising a transmitter for supplying a frequency-modulation ramp signal varying according to a linear law and a receiver for receiving the transmitted signal after reflection from a target at a determined distance resulting in a beat frequency between the transmitted signal and the received signal and a linearizing device of the ramp signal comprising a voltage controlled oscillator fitted with an output and associated with a phase-locked loop, a clock generator having a determined frequency, a digitally controlled oscillator comprising a first accumulator controlled by a digital word for generating at least one digital step ramp varying in a determined direction at the rate of the determined frequency and a second accumulator fitted with a carry output and controlled by the digital ramp to supply a digital step signal whose phase varies according to a parabolic law at the rate of the determined frequency and, inserted in the loop, a digital phase comparator having an output and a first and second input respectively connected to the carry output and to the output of the voltage controlled oscillator.

8. A radio altimeter as claimed in claim 7, wherein the receiver comprises a second digitally controlled oscillator for generating a controllable frequency signal and a mixer for receiving signals representative of and of the same frequency as the received signals so as to transpose the beat frequency into a lower frequency range.

9. A radio altimeter as claimed in claim 8, comprising means for digital-analog signal conversion and a Fast Fourier Transform calculation device which receives the converted signals and calculates said distance.

10. A radio altimeter as claimed in claim 7, comprising means for switching between a short range measurement mode and a long range measurement mode, these means including variable gain amplification circuits.

* * * * *